United States Patent [19]

Rudy

[11] 4,340,626

[45] Jul. 20, 1982

[54] DIFFUSION PUMPING APPARATUS SELF-INFLATING DEVICE

[76] Inventor: Marion F. Rudy, 19001 Vintage St., Northridge, Calif. 91324

[21] Appl. No.: 168,284

[22] Filed: Jul. 10, 1980

Related U.S. Application Data

[63] Continuation of Ser. No. 903,055, May 5, 1978, abandoned.

[51] Int. Cl.[3] .......................... A43B 13/20; B32B 1/06; E04B 1/34; E04G 11/04

[52] U.S. Cl. .......................................... 428/35; 2/413; 5/441; 5/442; 5/449; 5/450; 5/455; 36/29; 36/35 B; 36/43; 36/44; 52/2; 152/330 R; 273/61 A; 273/61 D; 273/65 R; 428/69; 428/72; 428/158; 428/166; 428/178; 441/30; 441/40

[58] Field of Search ............... 2/413; 5/441, 442, 449, 5/450, 455; 9/11 A, 13, 314; 36/29, 35 B, 43, 44; 52/2; 152/330 R; 267/65 R; 273/61 A, 61 D, 65 R; 428/69, 72, 158, 166, 178, 35

[56] References Cited

U.S. PATENT DOCUMENTS 2,997,291 8/1961 Stultz ................................... 267/64

FOREIGN PATENT DOCUMENTS 1145932 3/1969 United Kingdom .

*Primary Examiner*—James C. Cannon

*Attorney, Agent, or Firm*—Bernard Kriegel

[57] ABSTRACT

An elastomeric enclosure is initially inflated to a desired pressure by a gas having large molecules incapable of diffusing outwardly from the enclosure, except at a relatively slow rate. When the enclosure is surrounded by ambient air at atmospheric pressure, such air passes into the enclosures by reverse diffusion, thus extracting energy from the ambient sea of air to progressively increase the total pressure in the enclosure to a substantial extent over a period of several months, the pressure then decreasing very slowly over an extended period to its initial inflation pressure, such extended period being as much as about two years or more. This added energy may be used to perform useful work or used in various pneumatic devices to achieve essentially permanent inflation. Decrease in pressure below the initial inflation value continues at a very slow rate over an additional period of many months, and, in fact, several years, with the inflation pressure still remaining at a sufficiently high value which enables the inflated enclosures to still possess a useful life.

18 Claims, 23 Drawing Figures

COMPARISON OF THE BEST OTHER GASES PRESENTLY USED WHEN LOW DIFFUSION RATES ARE REQUIRED

EXPANDED SCALE

COMPARISON OF THE DIFFUSION OF NITROGEN THROUGH REPRESENTATIVE POLYMER BARRIER FILMS

"SELF-PRESSURIZATION" DUE TO REVERSE DIFFUSION

INITIALLY 100% SUPERGAS ($C_2F_6$)

DIFFUSION PUMPING APPARATUS SELF-INFLATING DEVICE

This application is a continuation, of application Ser. No. 903,055, filed May 5, 1978, now abandoned.

The present invention relates to pneumatic enclosures disposed in surrounding air at atmospheric pressure, such as 14.7 psia, the enclosures being initially partially or fully inflated to a desired pressure by a gas other than air, by a mixture of gases other than air, or by a mixture of such gases and air. Energy is then extracted from the ambient air, by means of a selective diffusion process to raise the level of potential energy within the enclosure, by increasing the pressure within the enclosure, and/or to cause the enclosure to do useful work and to perform beneficial tasks.

This extraction of energy from the surrounding ambient air, either to create increased pressure energy within the enclosure or to produce useful work is called "Diffusion-Pumping", the phenomenon of self-pressurization.

Diffusion pumping can be described in simple terms in the following way. With the present invention, the gas used for inflating an elastomeric pneumatic device is different from ambient air surrounding the device, or, it is at least partly different from the ambient air surrounding the device. The inflating gas (herein called "supergas") is selected from a group of gases having large molecules and low solubility coefficients, such gas exhibiting very low permeabilities and an inability to diffuse readily through the enclosures, which are made, at least partially, from elastomeric materials. With the elastomeric enclosure surrounded by ambient air, it is noted that the pressure within the enclosure rises comparatively rapidly after initial inflation. The rise in pressure is believed to be due to the nitrogen, oxygen, and argon in the ambient air diffusing through the enclosure to its interior, until the partial pressure of air in the enclosure equals the atmospheric pressure outside the enclosure. Since the initial inflating gas can diffuse out through the enclosure only very slowly, losing essentially no pressure, while the ambient air is diffusing inwardly, the total pressure within the enclosure thus rises appreciably. Such total pressure is therefore the sum of the partial pressures of the air within the enclosure and the pressure of the initial inflating gas within the enclosure.

In some devices, the pressure rises above the initial inflation pressure during the first two to four months of the diffusion pumping action, and then slowly starts to decline. When the total pressure rise reaches its peak level, diffusion pumping has progressed to the point that the partial pressure of air within the device has reached its maximum possible value of 14.7 psia. At this point in the process, two important things have occurred. First, the enclosure is now filled with a maximum amount of pressurizing medium (air) which cannot diffuse out of the device, because the pressure of the inside air is in equilibrium with the outside ambient air, i.e., both are at 14.7 psia. Second, the supergas pressure is now less than it was at initial inflation, primarily because of the increase in volume of the device due to stretching of the elastomeric film. At the lower pressure, the normally very low diffusion rate of the supergas is reduced to even lower values. Both of these two factors, i.e., maximum air at equilibrium pressure and minimum supergas, contribute to long term pressurization at essentially constant pressure. This pressurization approach is referred to herein as the "Permanent Inflation Techniques".

After the pressure reaches a peak, the rate of decline is very low, the total pressure in the enclosure remaining above the initial pressure for about two years or longer thereafter, depending upon the particular inflation gas used, the material from which the enclosure is made and the inflation pressure. As noted above, the decline in pressure may continue, but in view of the slow rate of diffusion of the gas from the enclosure, the pressure in the enclosure remains sufficiently high as to enable the elastomeric enclosure to continue to be used effectively for several additional years. The enclosure is therefore essentially permanently inflated.

Prior elastomeric pneumatic devices are usually inflated by air to a desired initial pressure above ambient pressure. In these devices the air can diffuse out quite rapidly with or without use, and the device quickly goes "flat" and becomes useless. In addition, in many cases the elastomeric material stretches under pressure thereby enlarging the internal volume and increasing the rate at which the device becomes unserviceable. Also, load applied to the devices further increases the air pressure therewithin thereby accelerating the outward diffusion of a portion of the air through the elastomeric device and producing an even more rapid decrease in the pressure below its initial pressure when the load is removed. Repeated application and removal of the load results in a progressive decrease of the internal air pressure, the inflated device very quickly losing its utility. Most gases (other than supergases) behave in a similar manner, the pressure in a pneumatic device progressively decreasing to a very low value over relatively short time periods.

With the present invention, not only is the device permanently inflated, as described above, but diffusion pumping helps maintain substantially constant pressure in the device even though the internal volume may increase due to stretching of the elastomeric material. When such a volume increase occurs, additional ambient air diffuses into the device and maintains the air pressure irrespective of volume increases. Further, diffusion pumping can maintain the internal pressure at a relatively constant level when the device is subjected to repeated application and removal of external loads, as described in more detail below.

An object of the invention is to provide an elastomeric enclosure disposed in an ambient air atmosphere, which is partially or entirely filled to less than fully distended volume with one or more of the special supergases, and in which the pressure within the enclosure increases above the pressure to which the enclosure was initially inflated, without resorting to decreasing the volume of the enclosure or mechanically injecting any additional gaseous medium into the enclosure.

Another object of the invention is to provide an elastomeric enclosure disposed in an ambient air atmosphere, which is initially fully inflated with one or more gases to a preselected pressure, and in which the pressure in the enclosure increases above the initial inflation pressure by extracting energy from the ambient air without the necessity for decreasing the volume of the enclosure or mechanically introducing any additional gaseous medium into the enclosure.

A further object of the invention is to provide an elastomeric enclosure device disposed in an ambient air atmosphere, which is partially or entirely filled with one or more of the special gases, which extracts energy from the atmospheric air and in doing so performs useful work.

A further object of the invention is to provide for permanent inflation in a device which utilizes as the inflation media a maximum amount of air, which is at 14.7 psia and in equilibrium with the pressure of outside ambient air, and a minimum amount of supergas. This permanent inflation technique thereby contributes to long term inflation at a relatively constant pressure. It is also a cost-effective approach, because the major constituent, air, enters the device automatically and at no cost.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings.

Figure 1:
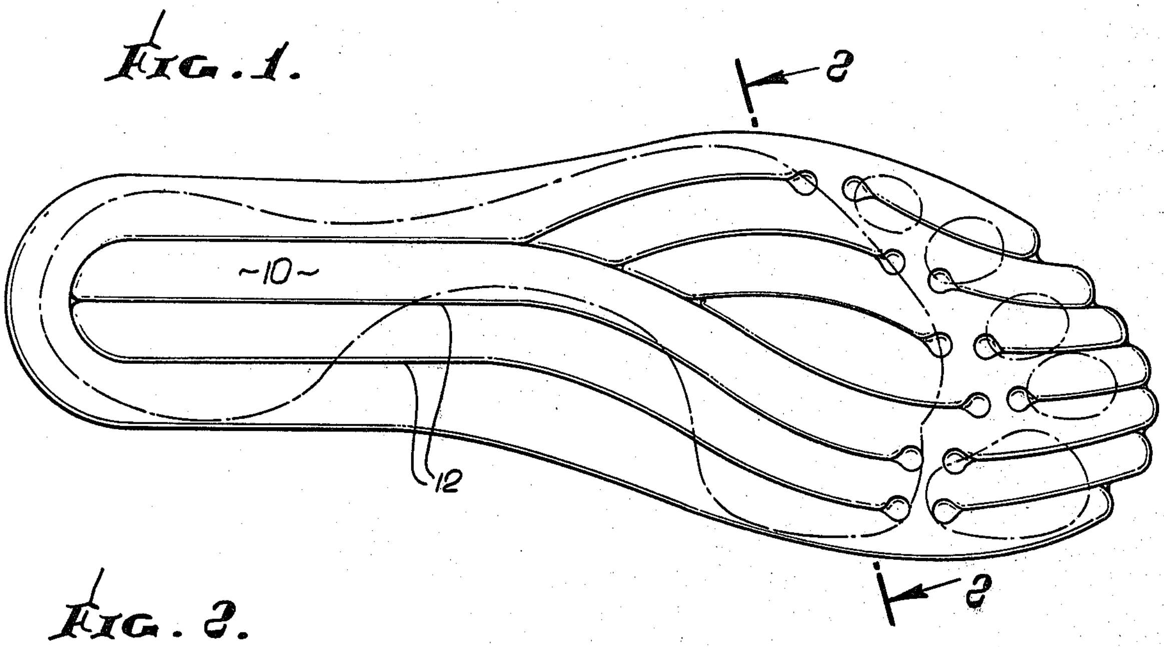
FIG. 1 is a top plan view of an insole embodying the invention.
Figure 2:
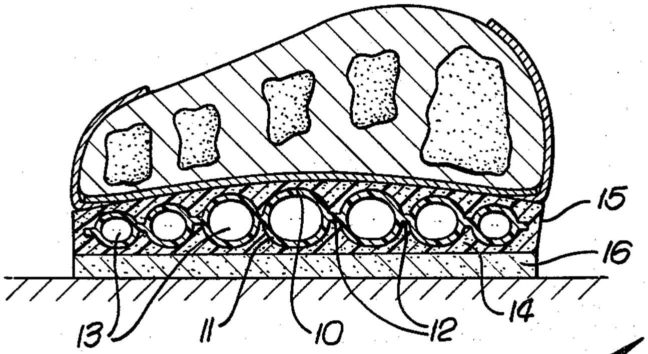
FIG. 2 is a section taken along the line 2—2 of FIG. 1, the insole being made of thin elastomeric film or sheet material and disclosing tubular chambers of the insole inflated and encapsulated in a shoe midsole.

A number of devices embodying the invention are disclosed in the drawings by way of examples. In FIGS. 1 and 2, an insole construction useful in footwear is illustrated, which is more specifically set forth in the application of Marion F. Rudy for "Improved Insole Construction of Articles of Footwear", Ser. No. 830,589, filed Sept. 6, 1977, now U.S. Pat. No. 4,183,156, which is a continuation-in-part of application Ser. No. 759,429, filed Jan. 14, 1977, now abandoned. As described in the applications, a pair of elastomeric, permeable sheets 10, 11 are sealed together at desired intervals along weld lines 12 to form intercommunicating chambers 13 which are later inflated with a gas, or a mixture of gases, to a prescribed pressure above atmospheric. The gas or gases selected have very low diffusion rates through the permeable sheets to the exterior of the chambers, the nitrogen, oxygen, and argon of the surrounding air having relatively high diffusion rates through the sheets into the chambers, producing an increase in the total pressure (potential energy level) in the chambers, resulting from diffusion pumping, which is the addition of the partial pressures of the nitrogen, oxygen, and argon of the air to the partial pressure of the gas or gases in the chambers.

By means of the concurrent processes of diffusion pumping and permanent inflation technique, these devices have a useful life of over five years.

The insole may be placed alone in a shoe, or, as shown in FIG. 2, it can be disposed within compressible encapsulating material 14, such as a compressible polyurethane foam, to form a midsole 15 having an outsole 16 secured thereto.

Figure 9:
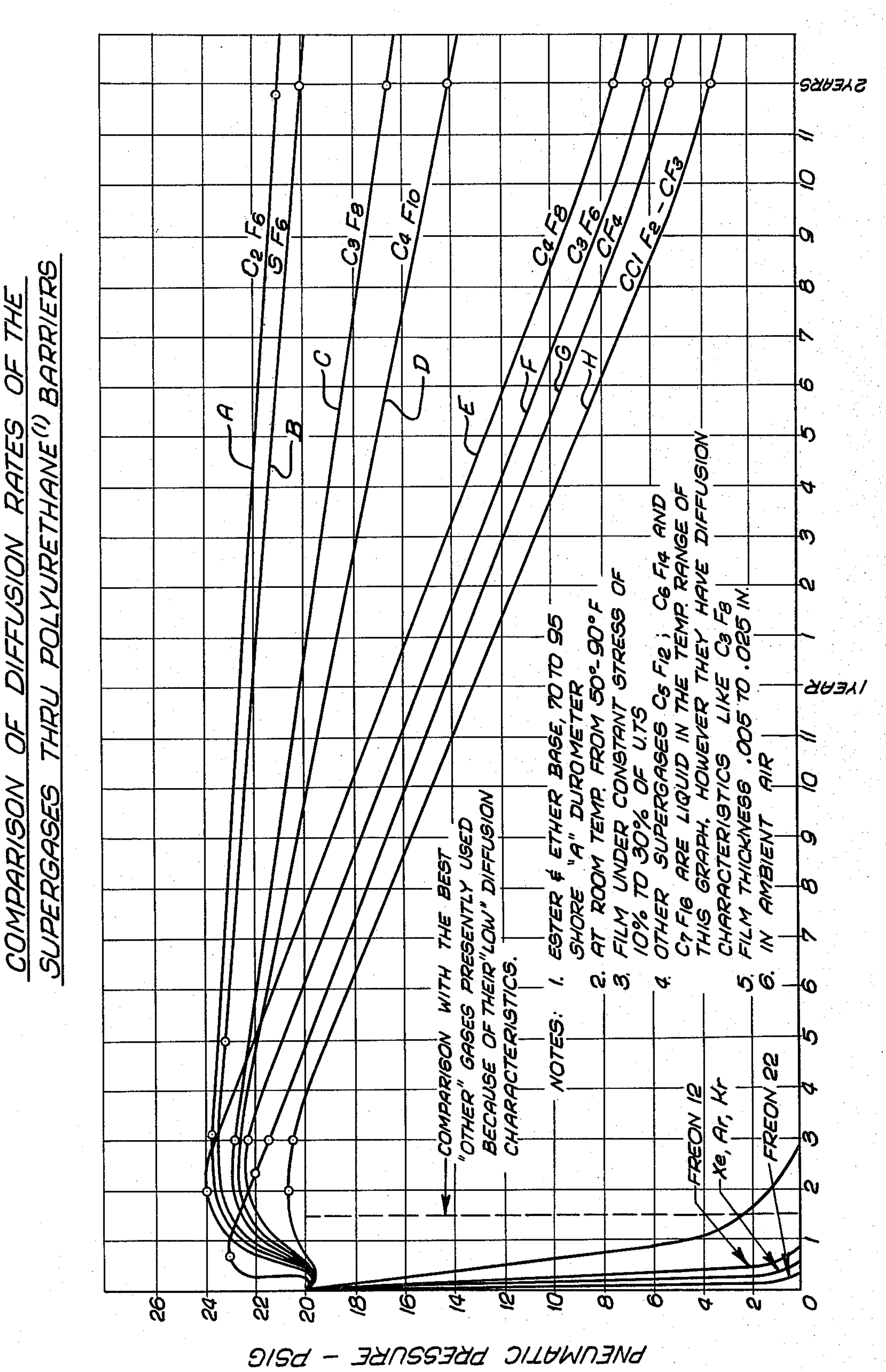
FIG. 9 is a graph representing pressures within intercommunicating chambers of FIGS. 1 and 2 over a period of time, in which different gases are used to initially inflate the chambers.
Figure 10:
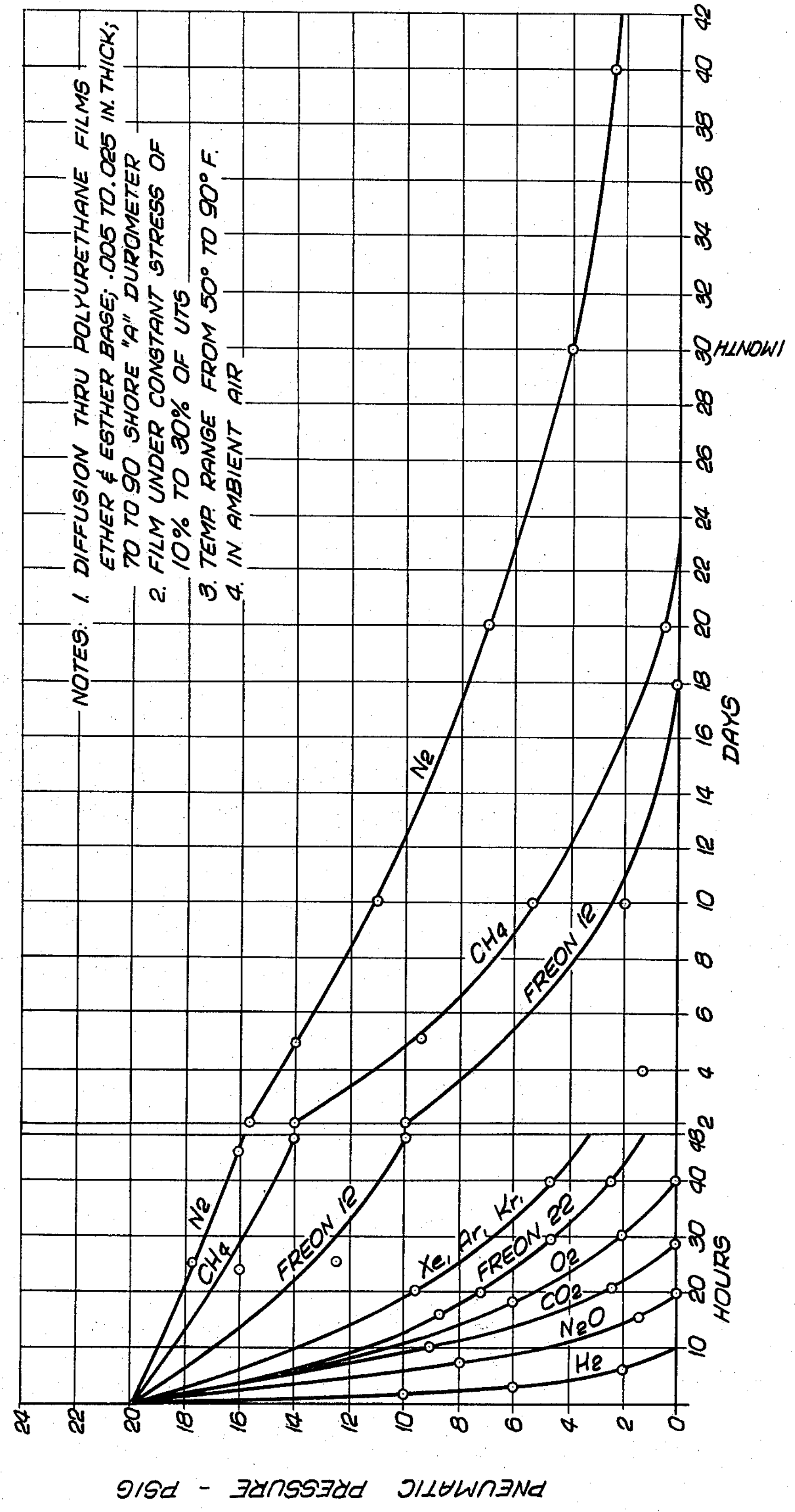
FIG. 10 is a graph, on an enlarged scale, of part of the left-hand portion of FIG. 9.

Inflation tests conducted over a five year period on chambered insole constructions, such as illustrated in FIGS. 1 and 2, in which the chambers 13 were pressurized with various large molecule low solubility coefficient gases, are shown in the graphs of FIGS. 9 and 10. The curves were arrived at by plotting pneumatic pressure above atmospheric against time, the sheets or film material used in making the insole being polyurethane. In curve A, the inflation gaseous medium was hexafluoroethane ($C_2F_6$), in which the initial inflation pressure was 20 psig. It should be noted that the pressure within the chambers first dropped slightly over a period of about one week and then began rising, reaching a maximum pressure in a little over three months of about 23.6 psig. The initial fall in pressure is believed to be due to the initial increase in volume of the chambers 13 as a result of tensile relaxation of the elastomeric material. After reaching a peak, the pressure then declines very gradually, having a valve of about 21 psig after a total elapsed time of two years. The maintenance of the pressure over such an extended period is believed to have been due to the inward diffusion of nitrogen, oxygen, and argon into the chambers of the insole made of polyurethane.

The results of inflation tests using other large molecule inflation gases are shown in curves B, C, D, E, F, G and H, the specified gases being identified on each curve. In each case, the pressure at first increased and then declined at a very low rate. In curve B, depicting inflation with sulfur hexafluoride ($SF_6$), the pressure within the chambers dropped to about 20 psig after two years. Octafluorocyclobutane ($C_3F_8$), curve C, had declined in total pressure to 20 psig after one year and to about 16.5 psig after two years. The gas of curve D declined to 14 psig after two years. Where the decline in a period of two years drops below 20 psig, as in curves C and D, the total pressure remaining in the enclosures was still adequate to properly support the foot of the wearer.

As contrasted with the gases shown in curves A to H, inclusive, the gases shown at the left portion of FIG. 9 lost pressure relatively rapidly. The lower left end portion of FIG. 9 is shown on a greatly enlarged scale on the graph, FIG. 10. In each case, the polyurethane enclosures were inflated to 20 psig. Chambers inflated with hydrogen, nitrous oxide, carbon dioxide or oxygen lost all of their pressure within 10 to 40 hours, the chambers becoming "flat" or fully deflated. The chambers inflated with Freon 22 ($CHClF_2$) lost all of their pressure within about three days, xenon, argon and cyrpton within less than six days, Freon 12 ($C Cl_2F_2$) within 18 days, and methane ($CH_4$) within 22 days. The chamber initially inflated to 20 psig with nitrogen lost pressure, which declined to a little more than 2 psig after 40 days. In all of these cases, the initially inflated chambers became ineffective over relatively short periods of time, when compared with the pressure retentions in the chambers when inflated with the gases shown in curves A to H, inclusive, of FIG. 9.

The gases used for initially inflating the elastomeric chambers are incapable of diffusing outwardly from the chambers except at an exceedingly slow rate. These gases are hereinafter sometimes referred to as "supergases". They include the following: hexafluoroethane, sulfur hexafluoride, perfluoropropane, perfluorobutane, perfluoropentane, perfluorohexane, perfluoroheptane, octafluorocyclobutane, perfluorocyclobutane, hexafluoropropylene, tetrafluoromethane, monochloropentafluoroethane, 1, 2-dichlorotetrafluoroethane; 1, 1, 2-trichloro-1, 2, 2 trifluoroethane, chlorotrifluoroethylene, bromotrifluoromethane, and monochlorotrifluoromethane.

The supergases have the following common characteristics: unusually large macromolecules, very low solubility coefficients, inert, non-polar, uniform/symmetric, spherical, speroidal (oblate or prolate) or symmetrically branched molecular shape, non-toxic, nonflammable, non-corrosive to metals, excellent dielectric gases and liquids, high level of electron attachments and capture capability, man-made, exhibit remarkably reduced rates of diffusion through all polymers, elastomers and plastics (solid film). Normally, as gas, liquids, or vapor molecules become larger, they also become more polar. The opposite is true with the supergases. They are among the least polar and most inert of all gases.

Typical sheets or films for producing the insoles and other chambered devices, and which function properly with respect to the supergases, can be selected from the group of elastomeric materials consisting of: polyurethane, polyester elastomer, fluoroelastomer, chlorinated polyethylene, polyvinyl chloride, chlorosulfonated polyethylene, polyethylene/ethylene vinyl acetate copolymer, neoprene, butadiene acrylonitrile rubber, butadiene styrene rubber, ethylene propylene polymer, natural rubber, high strength silicone rubber, low density polyethylene, adduct rubber, sulfide rubber, methyl rubber, and thermoplastic rubber.

Figure 11:
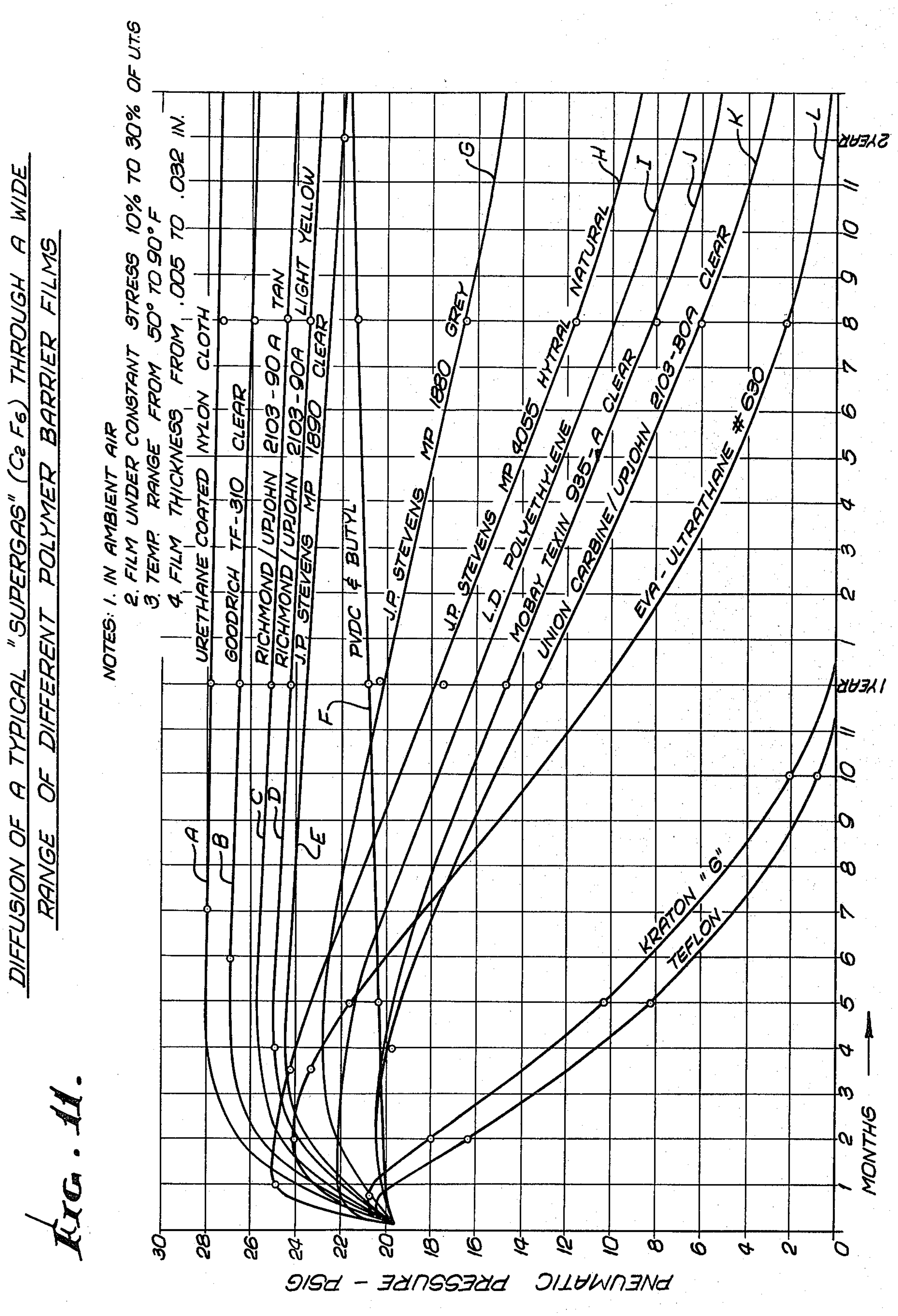
FIG. 11 is a graph representing the pressure within the intercommunicating chambers of FIGS. 1 and 2 over a period of time, the insole being made of different elastomeric materials and inflated initially with the same gas ($C_2F_6$)

In the curves shown in FIGS. 9 and 10, diffusion rates of supergases are set forth through polyurethane barriers. In FIG. 11 a graph is presented showing the diffusion rates of hexafluoroethane through a variety of representative polymer barrier films. To obtain the data for each curve, each chamber was pressurized to 20 psig. As shown in curve A, a pressure increase of 3 psig was obtained in about five months, where the barrier film was urethane coated nylon cloth, the pressure dropping to a total pressure of about 27.4 psig in about two years. Pressure increases to maximum values above 20 psig and then declines therefrom are also depicted in curves B, C, D, E and F for the barrier materials identified thereon. Within two years the total pressure bearing against the barrier film was still in excess of the initial pressure of 20 psig. The pressure in the polymer barrier films shown in curves G, H, I, J, K and L all increased to some extent above the initial pressure of 20 psig, but then declined from the greater pressure to below 20 psig as indicated in the graph.

Figure 12:
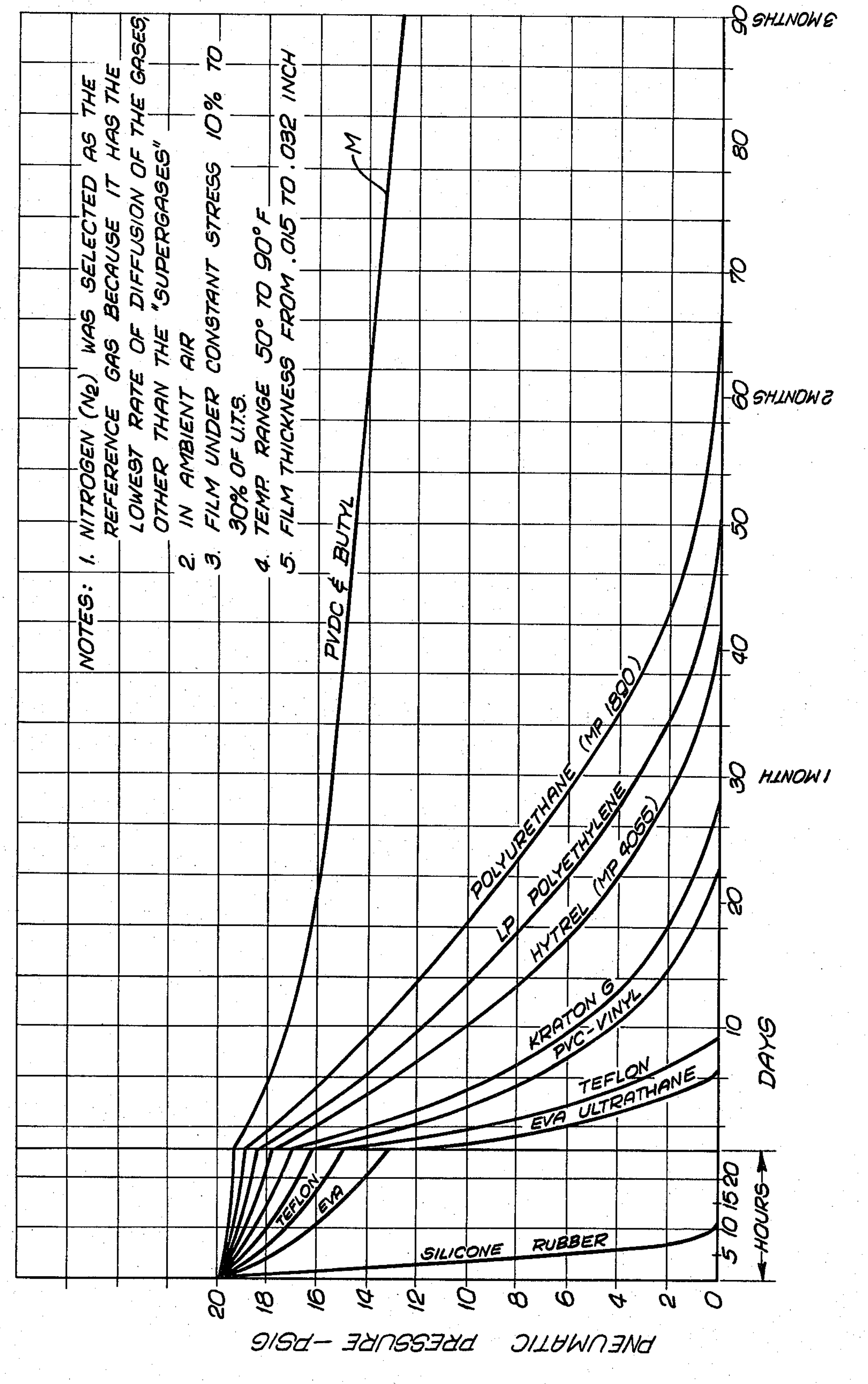
FIG. 12 is a graph similar to FIG. 11 illustrating the relatively faster rate at which nitrogen diffuses through representative polymer films.

FIG. 12 is a graph on an expanded scale showing the diffusion rate of nitrogen, initially under a pressure of 20 psig, through representative polymer barrier films identified in the graph. The comparatively high rate of diffusion of nitrogen through the barrier films results in the pressure of the remaining nitrogen gas in the chamber being substantially at zero gage within a maximum period of two months, except for the PVDC and Butyl, shown in curve M of FIG. 12.

Figure 13:
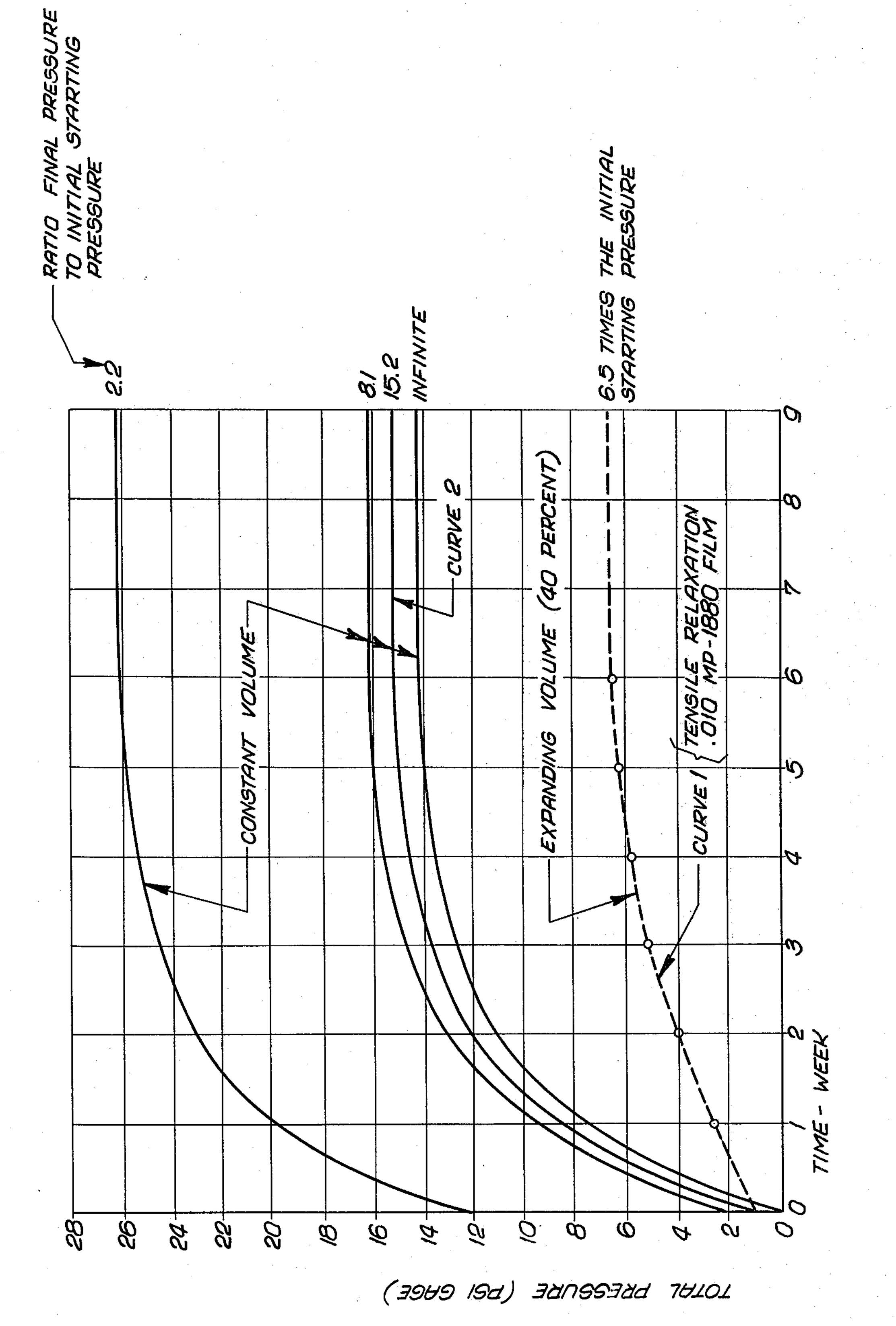
FIG. 13 is a graph showing the diffusion pumping of the elastomeric chambers due to reverse diffusion of air into the chambers.

The diffusion pumping phenomenon is strikingly demonstrated in elastomeric enclosures which are initially inflated to low pressure levels. For example, the pressure rise in an insole initially inflated to 1.0 psig with a supergas, such as hexafluoroethane, is shown in FIG. 13, curve 1. This particular insole was made from a relatively elastic material which caused the insole to grow 40% to 50% in volume as the internal pressure increased, the pressure rising about 550% during a six to eight week period. If the diffusion pumping had occurred in a constant volume enclosure made from one of the special elastomeric materials shown in the upper curves of FIG. 11, the pressure rise would have been even greater, i.e., 1420% (curve 2 of FIG. 13).

Figure 15:
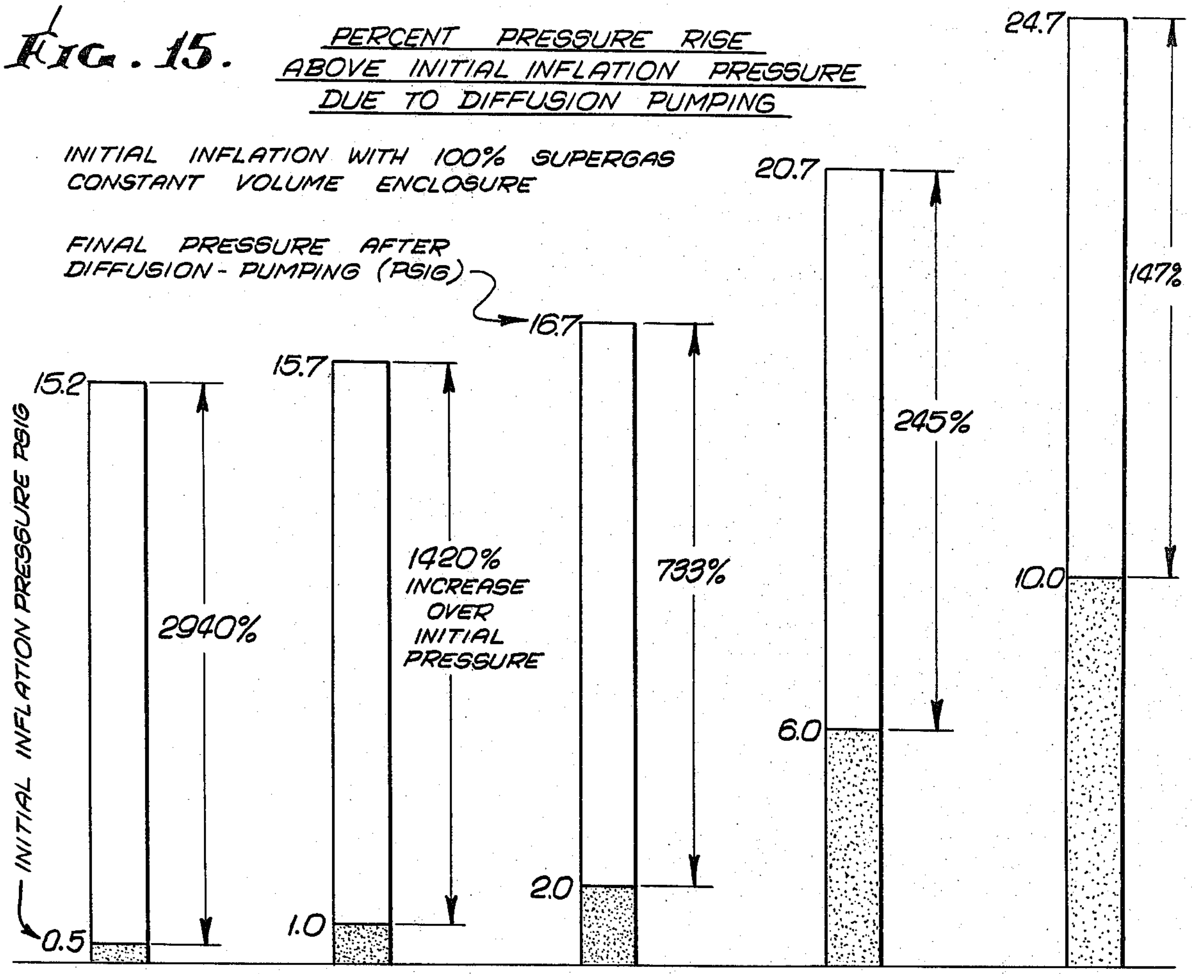
FIG. 15 is a bar chart showing percent pressure rise due to diffusion pumping in constant volume enclosures initially filled with a special gas at several different pressures.

The bar charts of FIG. 15 illustrate the percent pressure increases which are possible in constant volume enclosures made from the special elastomeric materials and filled initially with 100% supergas at the gage pressures indicated. As the bar charts shown, a large percentage increase in gage pressure occurs due to diffusion pumping. The maximum increment in pressure rise is 14.7 psi, which occurs at the conclusion of the diffusion pumping action when a maximum amount of air has diffused into the enclosure. Because this increment is constant irrespective of the initial gage pressure, when the initial gage pressure is low, the percentage rise in pressure is high. For instance, a percentage rise of 1420% occurs when the initial inflation pressure is 1.0 psig. The rise is 2940% when the initial pressure is 0.5 psig. The corresponding increase is 147% for an initial pressure of 10.0 psig.

The diffusion of the ambient air into an insole inflated initially with a supergas is well supported by an analysis of the gases in an insole of the type illustrated in FIG. 1, and which was initially inflated Dec. 10, 1975, to a pressure of 22 psig with pure sulfur hexafluoride gas. On Jan. 24, 1978, or slightly more than two years after the initial inflation, the pressure in the insole was checked and was found to be 19.5 psig. In the approximate elapsed time of two years, the insole increased in thickness by about 15.3%, indicating that the volume of the chambers in the insole had increased. Had the volume remained constant, the pressure in the insole after approximately two years would have been greater than the measured pressure of 19.5 psig.

The gases in the above insole were analyzed by mass spectroscopy in the latter part of Jan., 1978. The analysis showed that the insole contained 52% air by volume (nitrogen, oxygen, and argon in the same ratio as these elements appear in ambient air), 47% sulfur hexafluoride by volume, and 0.6% carbon dioxide by volume. Whereas, the gas initially introduced into the insole chambers was 100% sulfur hexafluoride, the analysis demonstrated that in a period of two years, air had been diffusion pumped through the elastomeric enclosure to its interior, while a small portion of the original sulfur hexafluoride had diffused through the elastomeric material of the insole to the atmosphere.

The 0.6% carbon dioxide found to be present in the insole chambers is approximately twenty times the amount normally found in ambient air. The relatively large amount of carbon dioxide is typical of urethanes and is due to outgasing from the urethane film from the basic reagent thereof.

The reverse or inward diffusion of ambient air into the insole or other specific devices containing supergas initially results in the maintenance of the total gage pressure in the insole at or near the initial inflation pressure, which, for example, is about 20 psig. However, a large difference in the makeup of the gas pressure contributing to the total gage pressure has taken place after the insole has been inflated. Initially, 100% of the gage pressure (and also the absolute pressure) within the insole comes from the supergas ($SF_6$). After two years the volume of the insole has increased 25–40% due to stretching of the highly stressed envelope forming the insole chambers. There has also been a small amount of pressure loss caused by the outward diffusion of the supergas from the chambers. Yet, the useful gage pressure is essentially unchanged, except for an intervening modest pressure rise during about the first two months following initial inflation (see FIG. 9). As the above mass spectroscopy analysis shows, 50% or more of the useful total pressure in the insole comes from the pressure of the ambient air that has diffused into the system. Thus, it is conclusively demonstrated that the diffusion pumping phenomenon is taking place, and the pressure rise shown is not the result of other mechanisms, such as a chemical reaction of the gas with the film or outgasing of the film.

The reverse of inward diffusion pumping action of the ambient air entering the enclosure, which contains at least a small amount of supergas, automatically extracts work energy from the surrounding atmosphere on a continuous basis during the life of the insole, and adds to the initial stored potential pressure energy within the insole in timed sequence so as to almost completely offset the negative factors of volume growth due to tensile relaxation of the highly stressed film or sheet, absorption and saturation of the supergas into the barrier film, small pressure loss from outward diffusion of the supergas, external air pressure changes due to altitude, and internal air pressure loss due to cyclic load applications.

In the example of the insole, were it not for the reverse diffusion pumping action of the air in combination with the supergas, the useful gage pressure of 20 psig would drop to less than one-half of its value in 2 to 3 months, primarily because of the volume increase of the enclosure. In lower pressure applications, the importance of the diffusion pumping of air is of even greater significance.

It is important to note that the partial pressure of the supergas is like a building block in combination with air. It is always additive to the partial pressure of air in the system. The contribution of the total useful gage pressure made by the air at 14.7 psia is a fixed and stable foundation for the supergas pressure. The 14.7 psia air pressure will never leak out since it is in complete equilibrium with the pressure of the outside air.

This situation further contributes to the long term inflation of the insole because the pressure components from the supergas is now much less than the initial full total pressure. At lower differential pressures, the normally very low diffusion rates of the supergas is reduced to a fraction of the higher pressure values creating a condition of virtual permanent inflation. As described earlier, this approach to long-term pressurization of enclosures at relatively constant pressure level, using as the inflating media a maximum amount of air at equilibrium pressure with outside ambient air plus a minimum amount of one or more of the supergases, is called the "Permanent Inflation Technique".

When long term cyclic loading and/or pressure changes take place so as to create an unbalance between the inside and ambient air pressure, the diffusion pumping action of the air works in a similar and beneficial way to extend the useful life of the product. As an example, if an insole that has reached stable air equilibrium at sea level is taken to a higher elevation where the ambient air pressure is lower (such as in an airplane or in the mountains), the firmness of the device would be greater than the optimum value when the insole is manufactured at sea level. The air performs a self-compensating function, since the air pressure within the insole is greater than outside, outward diffusion takes place, thus reducing the over-pressurization in restoring the device to approximately its original condition, having the desired load supporting characteristics.

If the same insole is now returned to sea level, it will be slightly softer than desired, because the partial pressure of air inside the insole will be less than the ambient air pressure. However, in a few hours the diffusion pumping action of the air will build up the internal air pressure to restore equilibrium. The total pressure in the insole will have again been automatically restored to the approximate desired useful gage pressure level.

This same action takes place when a person stands on the insoles continuously for a full day. During the day some air pressure loss occurs due to the load applied by the person. At night, the load is removed, the supergas expanding the device to its full volume, thus lowering the internal air pressure, diffusion pumping adding air pressure until the 14.7 psia balance is reached. Thus, in the morning when the insole is again worn by the person, the pressure lost the preceding day is restored for the following days use.

Figure 3:
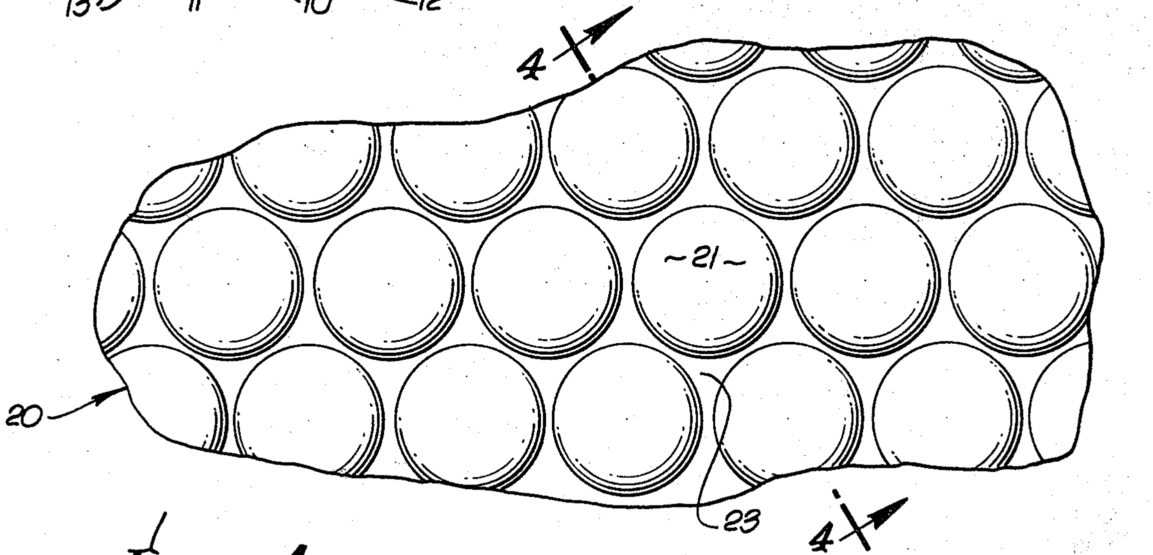
FIG. 3 is a top plan view of a cushioning or shock adsorbing device embodying the invention.
Figure 4:
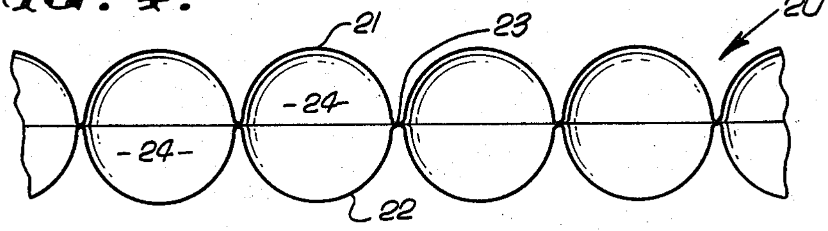
FIG. 4 is a section taken along the line 4—4 of FIG. 3, the cushioning device being made of thin elastomeric film material and disclosing spherical chambers of the cushioning device fully inflated.

There are many other applications of the diffusion pumping or self-pressurization system. As disclosed in FIGS. 3 and 4, it is applicable to elastomeric cushioning devices, such as disclosed in applicant's application, Ser. No. 844,080, filed Oct. 20, 1977, now abandoned, for "Elastomeric Cushioning Devices for Products and Objects". A segment of a cushioning device 20 is illustrated, formed from two sheets 21, 22 of elastomeric material, provided with circular welds 23 (as by use of radio frequency heat sealing techniques) to form discrete, substantially spherical chambers 24 partially or completely inflated by one of the supergases listed above, such gases having a low diffusion rate through the material of which the elastomeric sheets are made. The spherical chambers result from providing thin elastic films or sheets of material and inflating them fully.

The elements comprising the ambient air surrounding the cushioning device will diffuse inwardly through the sheets to the interiors of the chambers 24, the pressure within the chambers elevating over a period of time, as set forth above in connection with the graphs shown in FIGS. 9 and 11, the subsequent decline in pressure being at a very low rate and extending over a plurality of years, while maintaing the total pressure within the chambers at a useful value.

Figure 14:
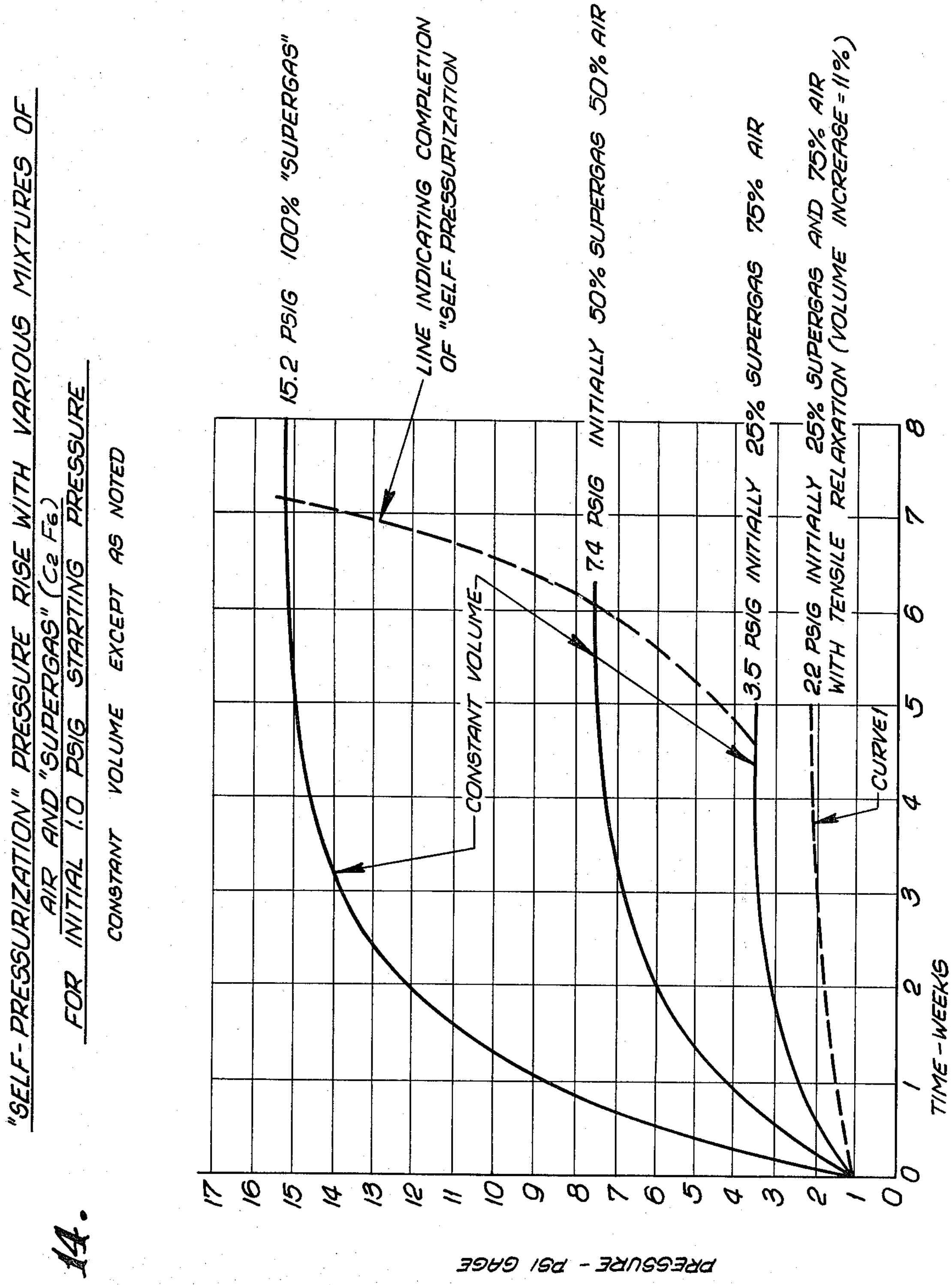
FIG. 14 is a graph similar to FIG. 13, showing the pressure rise, due to diffusion pumping in the elastomeric chambers, with different mixtures of air and other gas initially in the chambers.

The elevation in pressure can be lessened, if desired, by initially injecting a mixture of supergas and air into the chamber 24. For instance, when the cushioning devices are used for packaging materials, each pressurized chamber may be inflated to operate at low pressures, which are normally less than 2.0 psig, which requires that the increase in pressure, due to diffusion pumping caused by inward diffusion of air into the chambers, be mitigated. This can be done by inflating the chambers with mixtures of air and supergas. As an example, a mixture 25% supergas and 75% air in the elastomeric chambers 24 may result in a pressure rise from an initial pressure of 1.0 psig to 2.2 psig only (see FIG. 14, curve No. 1). The pressure rises of other mixtures of air and supergas are also depicted in FIG. 14.

As noted in application Ser. No. 844,080, further reduction in pressure rise can be achieved if the pressure chambers are not distended to their full, unstressed volume at initial inflation, but are in a wrinkled condition immediately after initial inflation. At this point the gage pressure is just slightly above zero psig (14.7 psia of supergas). As the diffusion pumping pressure rise occurs, the chamber volume expands and the pressure of the supergas falls. The key to this approach is to have the supergas partial pressure fall and arrive at the design pressure at the exact point when the chambers become fully distended. The ambient air passes through the elastomeric films into the chamber to increase the pressure therein. That is, the partial pressure of the air will add to the partial pressure of the supergas and produce the total pressure which will be above zero psig. However, the volume of the chamber will expand, because of its initial wrinkled condition, expansion continuing as the diffusion pumping continues until the final volume of the chamber is reached. This takes several weeks to occur to reach a stable condition, and the desired final internal pressure, which, for example, may be one-half psig. At this point, the air pressure inside the device is 14.7 psia and the supergas pressure has dropped to one-half psia. This is an ideal situation for long term permanent inflation, that is, the device is now inflated in accordance with the "Permanent Inflation Technique" described earlier.

Figure 8:
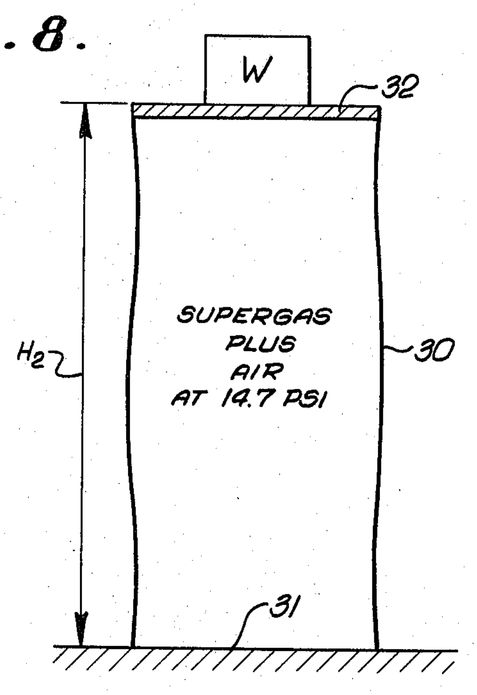
FIG. 8 is a view similar to FIG. 7, disclosing the chamber expanded to a greater volume.
Figure 7:
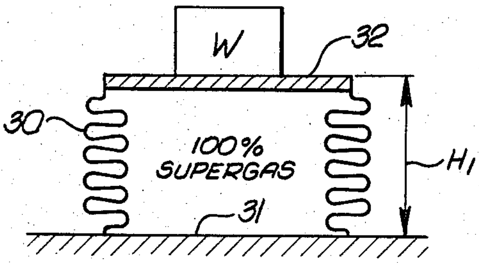
FIG. 7 is a vertical section through yet another embodiment of the invention, including a chamber having an initial volume and containing a load supporting gas.

Another application of the invention is in connection with a diffusion pumping pneumatic lift device, shown in FIGS. 7 and 8. This device is a good example of the use of diffusion pumping to do work. A permeable inflatable bag or bellows 30 is suitably closed at its lower end, as by a base 31, and also at its upper end by a horizontal platform 32 on which a weight W rests. The bag or bellows 30 is inflated with a supergas to the extent at which the platform is disposed a desired distance $H_1$. Because the gage pressure to which the elastomeric enclosure has been inflated must always support the weight W, such gage pressure will remain constant. As the energy of the oxygen, nitrogen and argon in the ambient air diffuses inwardly into the enclosure, the volume of gas in the enclosure increases and the platform 32 with the weight W thereon will rise as the bellows expands until the latter becomes fully extended, the platform being elevated to the height $H_2$. The platform will continue to be elevated until the air pressure within the enclosure reaches 14.7 psia (atmospheric pressure) at standard sea level conditions and 70° F. No external power source is required to elevate the weight W from the height $H_1$ to the height $H_2$. The elevation is achieved automatically as a result of diffusion pumping, i.e., the inward diffusion of nitrogen, oxygen, and argon from the ambient air into the elastomeric, or expandable, enclosure 30. The total pressure within the enclosure 30 remains at atmospheric plus the increment of total pressure above ambient pressure required for supporting the weight.

At the point of initial inflation, the total pressure is 100% due to the supergas. As the air enters the enclosure and the platform rises, the total pressure remains constant. However, the portion of total pressure due to the partial pressure of the air increases as the platform rises. Correspondingly, the partial pressure of the sugergas falls. The platform will continue to rise until the partial pressure of the air reaches it maximum value, i.e., 14.7 psia. At this point the supergas has reached its minimum value. However, the total pressure (air plus supergas) has not changed. It is the same as it was at the point of initial inflation.

The work that can be performed by the pneumatic lift device can be very substantial, especially in larger size applications. For example, the following table indicates the amount of work which can be accomplished by three different versions of the device having platform diameters of 1 foot, 2 feet and 3 feet. In each case, a 1000 pound weight is disposed upon the platform and the inflatable bellows is inflated to an initial height of 1 foot with 100% supergas.

| | Platform Diameter | | |
|---|---|---|---|
| | 1 Foot | 2 Feet | 3 Feet |
| Maximum height of lift (feet)* | 1.66 | 6.65 | 14.97 |

-continued

| | Platform Diameter | | |
|---|---|---|---|
| | 1 Foot | 2 Feet | 3 Feet |
| Maximum work of lift (ft-lbs)* | 1,660 | 6,650 | 14,970 |
| Relative quantity of air (unit) | 1.0 | 12 | 55 |
| Relative quantity of supergas (unit) | 1.0 | 3 | 6 |

*Due to diffusion pumping.

The data above shows that the larger devices are more efficient. For instance, the 3-foot diameter device can do 9 times more work than the 1-foot application with only 6 times as much supergas. The large device uses 55 times more air than the small device.

Figure 5:
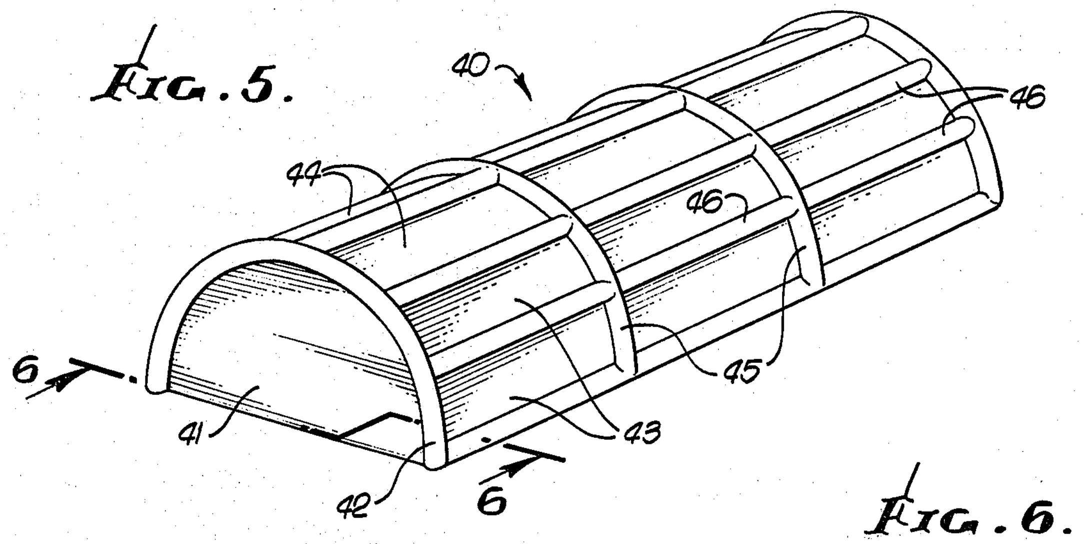
FIG. 5 is an isometric view of an inflatable enclosure or building structure constituting another embodiment of the invention.
Figure 6:
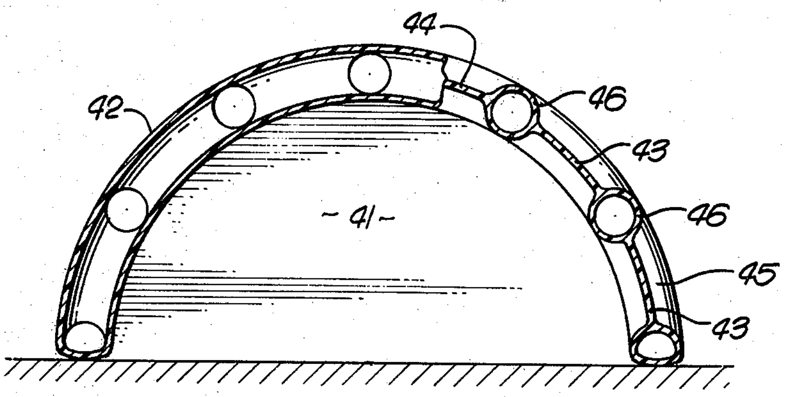
FIG. 6 is an enlarged section taken along the line 6—6 on FIG. 5.

A further application of the invention is in connection with protective enclosures or buildings 40, such as shown in FIGS. 5 and 6. The enclosure includes end walls 41 secured to inverted tubular arches 42, and side and top walls 43, 44 secured to the arches 42 and intervening inverted tubular arches 45, and also to longitudinal tubular elastomeric members 46, the ends of which are attached and communicate with the tubular arches 45, 42 to form an integral structure therewith.

The entire structure can be transported and stored in a collapsed condition, that is, with no air or gas trapped within the intercommunicating tubular members 42, 45, 46, the end walls 41 and side and top walls 43, 44 being flexible so as to be foldable. When the site is reached at which the enclosure is to be erected, a small quantity of one of the sugergases listed above is pumped into the intercommunicating tubular members 42, 45, 46. The quantity of supergas need merely be enough to cause the tubular members of the structure to distend slightly, to about 1/10 to 1/5 of their maximum fully inflated condition. At this point, the gage pressure of the supergas is essentially zero (i.e., only a few ounces of pressure above ambient pressure of 14.7 psia). The structure is still in a limp and wrinkled condition and is only bulging slightly more than a "lying-flat-upon-the-ground" configuration. Now the structure is ready for the energy transfer of diffusion pumping, which causes it to self-inflate to a fully erected and rigidized condition.

Diffusion pumping causes the tubular members to inflate and expand into their arch shape, or straight line form, until they assume a substantially rigid condition, with the end walls 41 and the side and top walls 43, 44 in a taut condition. A considerable amount of work is done by diffusion pumping during the erection of the structure.

The pressure will remain at the desired elevated values over extended periods, because, when fully erected, the structure is pressurized in accordance with the "Permanent Inflation Technique". The enclosures 40 are easily transported when in a deflated and collapsed condition, and are readily inflated by the selected supergas, or by a supergas and air mixture, to the desired pressure above atmospheric at which the enclosure will assume its fully erected and rigidized condition.

Figure 16:
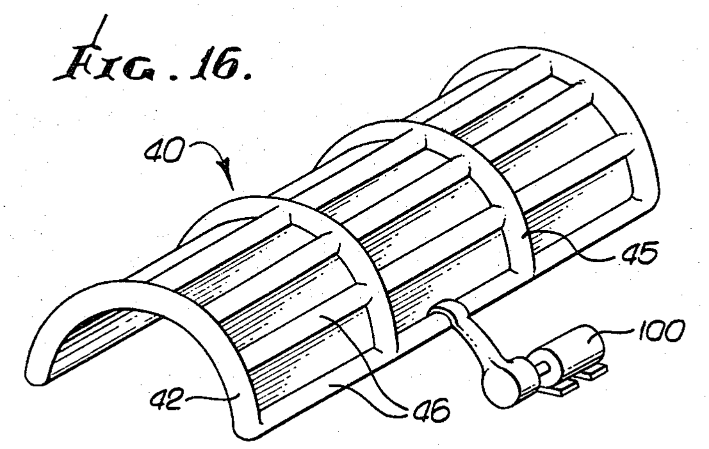
FIG. 16 is another view of the pressurized structure of FIG. 5 where the structure is 100% inflated with air and the pressure is maintained at a suitable level by means of an electric motor-pump combination.
Figure 16A:
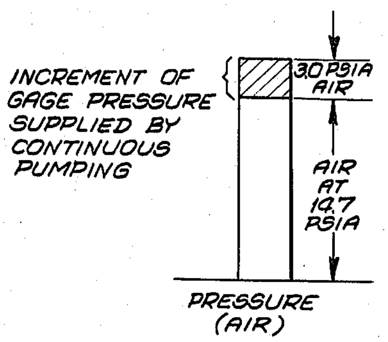
FIG. 16a is a bar chart showing the type of gaseous medium required to maintain the required pressure in the structure shown in FIG. 16.
Figure 17:
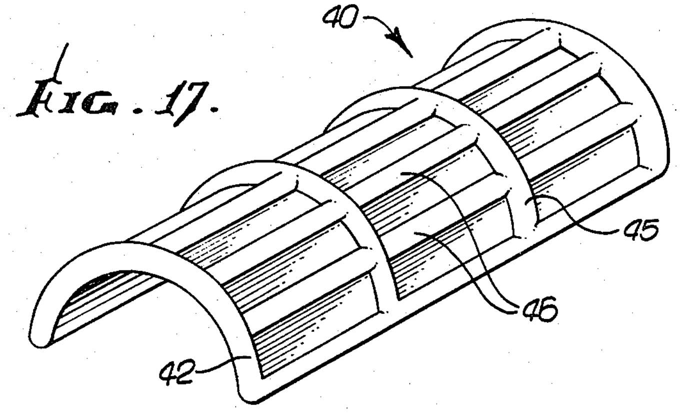
FIG. 17 is another view of the pressurized structure of FIG. 5 inflated with supergas and air.

The advantages of diffusion pumping are further high-lighted in FIGS. 16 and 17. FIG. 16 shows the inflatable structure in its fully pressurized and erected configuration, with only air used as the inflation medium. In this case, it is necessary to maintain the pressure within the structure by means of some type of mechanical pumping device 100 because the pump must supply new air to make up for the air which diffuses out of the enclosure. The bar chart, FIG. 16*a*, shows that inflation has been produced by the pump 100, which has forced air into the arches 42, 45 and longitudinal members 46 until the air pressure is 17.7 psia.

Figure 17A:
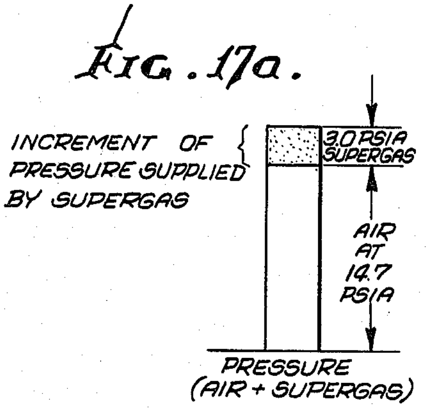
FIG. 17a is a bar chart showing the components of the gaseous medium for maintaining the required pressure in the structure shown in FIG. 17.

On the other hand, if supergas and diffusion pumping are used to self-erect the structure, it will maintain a fully rigidized condition for long periods of time. This occurs because at the end of the diffusion pumping self-pressurization cyle, the enclosure is automatically inflated to the "Permanent Inflation Technique" condition. This situation is illustrated in FIG. 17. The bar chart (FIG. 17*a*) shows that the inflation of the structure is with a maximum amount of air at 14.7 psia and a minimum amount of supergas (3.0 psia). The small amount of supergas can maintain the structure in a permanently erected condition because the supergas is supported upon a 14.7 psia "foundation" of air. There is no need to use an air-pump to supply energy to this system, as in FIG. 16.

Figure 18:
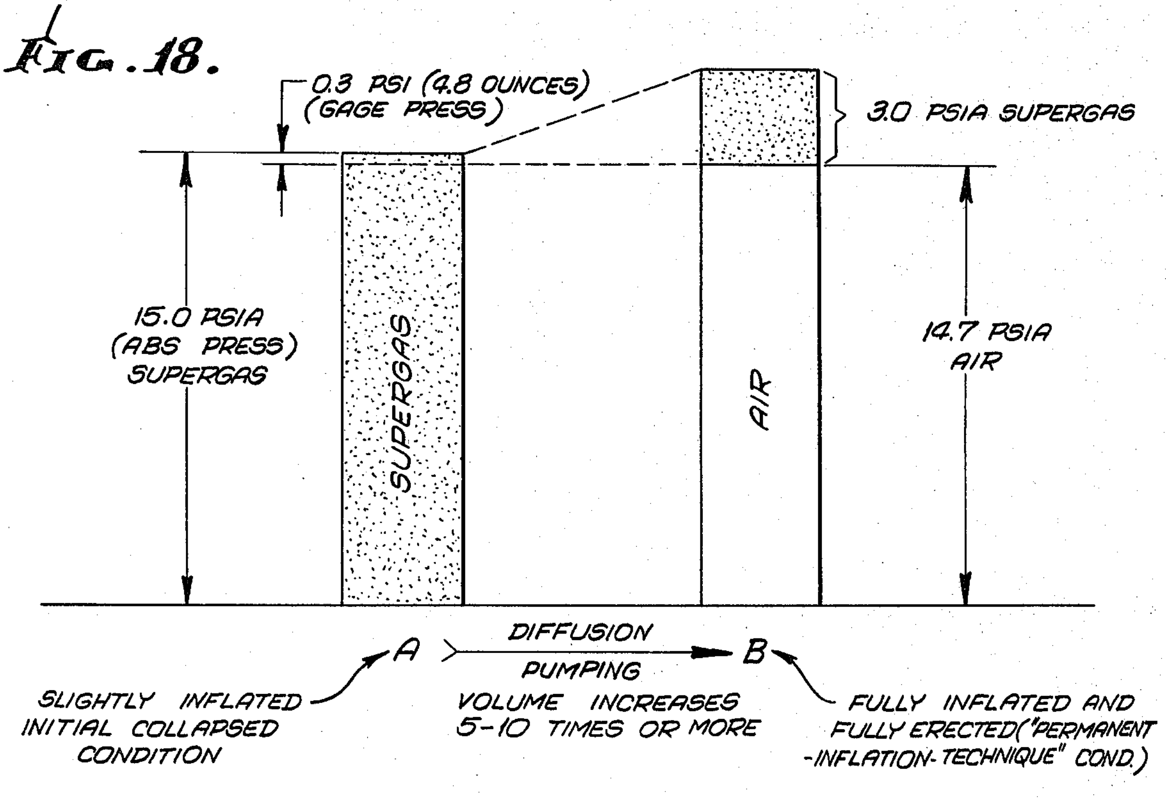
FIG. 18 is a bar chart showing the relative quantities of air and supergas within the inflatable structure both at the point of initial inflation and also after the structure has been erected from a collapsed condition to a fully pressurized condition by means of diffusion pumping.

FIG. 18 is a bar chart which illustrates the pressure condition within the structure when initially inflated (Bar - A) and also at the end of the diffusion pumping cycle when the structure is fully erected (Bar - B). As is seen, at initial inflation the total pressure is 100% due to supergas. The supergas pressure is 15.0 psia, which is just a few ounces of pressure above ambient pressure. Therefore, the enclosure is only slightly inflated and is essentially in a collapsed condition. However, when the diffusion pumping cycle is completed and the structure is fully erected, the supergas pressure has dropped to 1/5 to 1/10 of its original value of 15.0 psia and is now 3.0 psia. This pressure drop is due to the volume increase of the enclosure during the erection process. While this is occurring, air continues to enter the enclosure until the air pressure in the tubular members 42, 45, 46 reaches 14.7 psia.

The air pressure is at a maximum level and the supergas is at a minimum level, once again exemplifying the "Permanent Inflation Technique".

Figure 19:
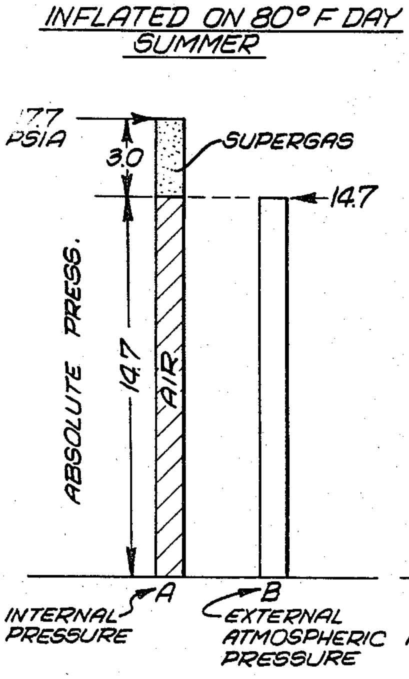
FIGS. 19, 20 and 21 are a series of bar charts illustrating the variation of the pressures of supergas and air within the inflatable structure during changes in ambient temperature and the self-compensation effect of diffusion pumping.
Figure 20:
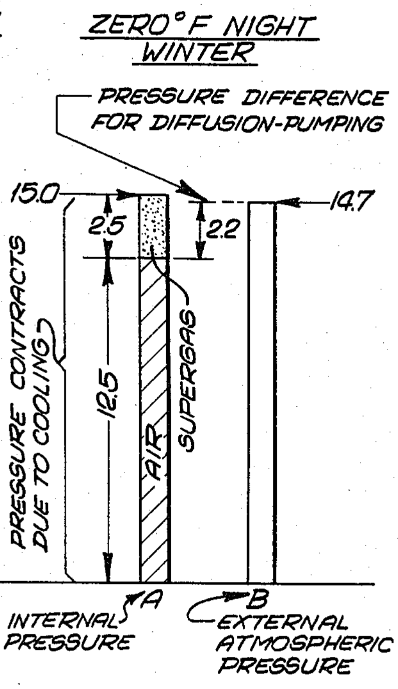
Figure 21:
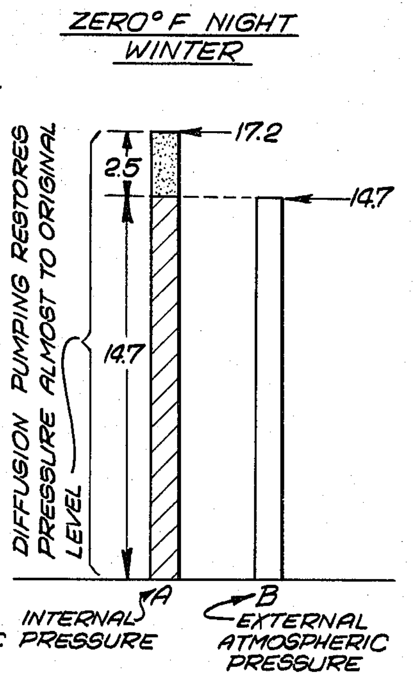

Throughout the time the structure is inflated in this manner, diffusion pumping continues to play an important role. For instance, diffusion pumping compensates for the effects that changes in ambient temperature have on the pressure within the enclosure. This compensation effect can be understood by referring to FIGS. 19, 20 and 21. FIG. 19 shows the structure on an 80° F. summer day. The bar chart A illustrates the levels of partial pressure of air and supergas within the structure. The supergas pressure of 3.0 psia, when supported by the 14.7 psia "foundation" of air, is sufficient to maintain the tubular members of the structure in a rigid condition. However, if the outside air temperature drops 80° F., as on a zero °F. night (FIG. 20), both the supergas pressure and the air pressure within the device are reduced due to the cooling effect. The total pressure of 15.0 psia within the structure would not be enough to keep the device from collapsing. However, the structure does not collapse, because as the air within the tubular enclosure gradually cools down, a pressure differential is created between the outside air and the inside air which causes outside air to diffuse inwardly to maintain the internal air pressure at 14.7 psia. To simplify the explanation, FIG. 20 illustrates the cold ambient temperature condition as though the temperature drop were instantaneous. A comparison of the outside air pressure (Bar - B) with the internal air pressure (Bar - A) shows a 2.2 psi pressure differential to exist for diffusion pumping. FIG. 21 illustrates the final equilibrium condition for the cold day and shows that diffusion pumping can maintain internal air pressure at 14.7 psia irrespective of temperature changes, and thus maintain sufficient total pressure within the tubular structure to keep the structure properly erected and rigidized. The gage pressure is 2.5 psig as shown by bar chart A of FIG. 21.

The structure can also be pressurized and erected with the "Permanent Inflation Technique" at the time of initial inflation. Instead of inflating with 100% supegas as when inflation is to be followed by the self-erection cycle, initial inflation would be with the appropriate mixture of air and supergas to give 14.7 psia partial pressure of air plus the appropriate small pressure increment of supergas. One way of doing this would be to first erect and fully inflate the structure with an airpump and then to add a small amount of supergas. Any excess air pressure (above ambient pressure) will diffuse out to establish equilibrium conditions.

Another use of the diffusion pumping phenomenon is in connection with the manufacture of play balls, such as tennis balls, volley balls, basketballs, and the like. The balls are hollow and are made of elastomeric permeable material. They are initially inflated with a proper mixture of air and supergas at ambient pressure, after which the pressure which each ball will automatically increase by inward diffusion to a predetermined pressure level higher than atmospheric pressure.

After the initial full inflation has been achieved as a result of this diffusion pumping action, the balls then will exhibit the permanent inflation characteristic described above. Therefore, the balls will remain inflated indefinitely. In the case of tennis balls, the need to pack the balls in hermetically sealed pressurized metal containers, to maintain their proper internal pressure, is eliminated.

During use, the balls will lose some pressure due to the outward forcing of nitrogen, oxygen and argon within the ball through the permeable membrane, but when not in use, diffusion pumping will occur and the total pressure therein will return to the desired value.

Diffusion pumping can also compensate for changes in altitude, as discussed above. Such compensation is especially useful in the case of tennis balls. Diffusion pumping will always maintain the gage pressure of the tennis ball at its proper value at every altitude where the balls are used (usually 14.0 psig). With present tennis balls, it is necessary for the ball manufacturer to produce special balls having a specific pressure for some of the localities with more extreme altitude conditions.

I claim:

1. A self inflating device, comprising a sealed chamber of preformed shape, at least a portion of said chamber being of a layer of permeable elastomeric sheet material surrounded by ambient air at atmosheric pressure, said chamber being inflated initially, after having been shaped, with a gaseous medium comprising an inert, non-polar, large molecule gas having a low solubility coefficient, said elastomeric material having characteristics of relatively low permeability with respect to said gas to resist diffusion of said gas therethrough from said chamber and of relatively high permeability with respect to the ambient air surrounding said chamber to permit diffusion of said ambient air through said elastomeric material into said inflated chamber to provide a total pressure in said chamber which is the sum of the partial pressure of the gas in said chamber and the partial pressure of the air in said chamber, the diffusion rate of said gas through said elastomeric material being substantially lower than the diffusion rate of nitrogen through said elastomeric material.

2. A device as defined in claim 1; said chamber being formed entirely of said elastomeric material.

3. A device as defined in claim 1; wherein said elastomeric material of said chamber is either polyurethane, polyester elastomer, fluoroelastomer, chlorinated polyethylene, polyvinyl chloride, chlorosulfonated polyethylene/ethylene vinyl acetate copolymer, neoprene, butadiene acrylonitrile rubber, butadiene styrene rubber, ethylene propylene polymer, natural rubber, high strength silicone rubber, low density polyethylene, adduct rubber, sulfide rubber, methyl rubber or thermoplastic rubber.

4. A device as defined in claim 1; wherein said gas comprises hexafluoroethane.

5. A device as defined in claim 1; wherein said gas comprises sulfur hexafluoride.

6. A device as defined in claim 1; wherein said elastomeric material is polyurethane.

7. A device as defined in claim 1, said chamber initially containing a mixture of said gas and air.

8. A device as defined in claim 1; said chamber initially containing a mixture of said gas and nitrogen.

9. A device as defined in claim 1, said chamber initially containing a mixture of said gas and oxygen.

10. A device as defined in claim 1; said chamber initially containing a mixture of said gas and argon.

11. A self inflating device, comprising a sealed chamber of preformed shape, at least a portion of said chamber being of a layer of permeable elastomeric sheet material exposed to external air at atmospheric pressure, said chamber being inflated initially, after having been shaped, with a gaseous medium to a desired initial value, said gaseous medium comprising an inert, non-polar, large molecule gas having a low solubility coefficient, said elastomeric material having characteristics of relatively low permeabiity with respect to said gas to resist diffusion of said gas therethrough from said chamber and of relatively high permeability with respect to said external air to permit diffusion therethrough of said external air into said inflated chamber to provide a total pressure in said chamber which is greater than the initial inflation pressure and is the sum of the partial pressure of the gas in said chamber and the partial pressure of the air in said chamber, said gas being either hexafluoroethane, sulfur hexafluoride, perfluoropropane, perfluorobutane, perfluoropentane, perfluorohexane, perfluoroheptane, octafluorocyclobutane, perfluorocyclobutane, hexafluoropropylene, tetrafluoroethane, 1,1,2-trichloro-1,2,2-trifluoroethane, chlorotrifluoroethylene, bromotrifluoromethane, or monochlorotrifluoromethane.

12. A device as defined in claim 11; wherein said elastomeric material of said chamber is either polyurethane, polyester elastomer, fluoroelastomer, chlorinated polyethylene, polyvinyl chloride, chlorosulfonated polyethylene, polyethylene/ethylene vinyl acetate copolymer, neoprene, butadiene acrylonitrile rubber, butadiene styrene rubber, ethylene propylene polymer, natural rubber, high strength, silicon rubber, low density polyethylene, adduct rubber, sulfide rubber, methyl rubber or thermoplastic rubber.

13. A self inflating device, comprising a sealed chamber of preformed shape, at least a portion of said chamber being of a layer of permeable elastomeric sheet material surrounded by ambient air at atmospheric pressure, said chamber being inflated, after having been shaped, with a gaseous medium to a desired initial value, said gaseous medium comprising an inert, non-polar, large molecule gas other than air, oxygen or nitrogen having a low solubility coefficient, said elastomeric material having characteristics of relatively low permeability with respect to said gas to resist diffusion of said gas therethrough from said chamber and of relatively high permeability with respect to the ambient air surrounding said chamber to permit diffusion of said ambient air through said elastomeric material into said chamber to provide a total pressure in said chamber which is greater than the initial inflation pressure of said gas and is the sum of the partial pressure of the gas in said chamber and the partial pressure of the air in said chamber, the diffusion rate of said gas through said elastomeric material being substantially lower than the diffusion rate of nitrogen through said elastomeric material, said chamber being formed entirely of permeable elastomeric material, wherein said gas is either hexafluoroethane, sulfur hexafluoride, perfluoropropane, perfluorobutane, perfluoropentane, perfluorohexane, perfluoroheptane, octafluorocyclobutane, perfluorocyclobutane, hexafluoropropylene, tetrafluoroethane, 1,1,2-trichloro-1,2,2-trifluoroethane, chlorotrifluoroethylene, bromotrifluoromethane, or monochlorotrifluoromethane.

14. A device as defined in claim 13; wherein said elastomeric material of said chamber is either polyurethane, polyester elastomer, fluoroelastomer, chlorinated polyethylene, polyvinyl chloride, chlorosulfonated polyethylene, polyethylene/ethylene vinyl acetate copolymer, neoprene, butadiene acrylonitrile rubber, butadiene styrene rubber, ethylene propylene polymer, natural rubber, high strength silicone rubber, low density polyethylene, adduct rubber, sulfide rubber, methyl rubber or thermoplastic rubber.

15. A device as defined in claim 1, 4 or 13; said chamber initially containing said gas at above atmospheric pressure, said air diffusing through said elastomeric material adding its partial pressure to the initial gas pressure in said chamber.

16. A device as defined in claim 15; said chamber being formed entirely of permeable elastomeric sheet material.

17. A device as defined in claims 1, 4, or 13, wherein the initial partial pressure of said gaseous medium in said chamber is superatmospheric.

18. A device as defined in claims 1, 4, or 13, wherein said chamber comprises opposed layers of said permeable elastomeric sheet material surrounded by air at atmospheric pressure, said layers being sealed to each other to provide a chamber of predetermined size and shape between said layers.

* * * * *